(12) United States Patent
LaFond (10) Patent No.: US 7,720,661 B2
(45) Date of Patent: May 18, 2010

(54) LOW VIBRATION RECTIFICATION IN A CLOSED-LOOP, IN-PLANE MEMS DEVICE

(75) Inventor: Peter H. LaFond, Redmond, WA (US)

(73) Assignee: Honeywell International Inc., Morristown, NJ (US)

( * ) Notice: Subject to any disclaimer, the term of this patent is extended or adjusted under 35 U.S.C. 154(b) by 1257 days.

(21) Appl. No.: 11/068,692

(22) Filed: Feb. 28, 2005

(65) Prior Publication Data

US 2006/0195305 A1     Aug. 31, 2006

(51) Int. Cl.
*G06F 17/50* (2006.01)
*G06F 17/10* (2006.01)

(52) U.S. Cl. ............................................. 703/13; 703/2
(58) Field of Classification Search .................... 703/2, 703/6, 13
See application file for complete search history.

(56) References Cited

FOREIGN PATENT DOCUMENTS

EP     1160574 A1    12/2001

OTHER PUBLICATIONS

Yeh et al.: Electrostatic Model for an Asymmetric Combdrive; Journal of Microelectromechanical Systems, vol. 9, No. 1, Mar. 2000; pp. 126-135.*

Avdeev; Modeling in-plane misalignments in lateral combdrive transducers; Institute of Physics Publishing Journal of Micromechanics and Microengineering; J. Micromech. Microeng. 13 (2003) 809-815 PII: S0960-1317(03)60137-3.*

Walied A. Moussa, et al.; Investigating the reliability of electrostatic comb-drive actuator used in microfluidic and space systems using finite element analysis; Canadian Journal of Electrical Engineering, Oct. 2002.

Francis E.H. Tay, et al.; A differential capacitive low-g microaccelerometer with mg resolution; Sensors and Actuators, S.A. Lausanne, CH, Oct. 2000.

John D. Grade, et al.; Design of Large Deflection electrostatic Actuators; Journal of Microelectromechanical Systems, Jun. 2003.

Ilya Avdeev, et al.; Strongly coupled three-dimensional finite element transducer; Mounal of Micromechanics and Microengineering, vol. 14. 2004, pp. 1491-1502.

* cited by examiner

*Primary Examiner*—Hugh Jones (57) ABSTRACT

A method for a geometry of a lateral comb drive for an in-plane, electrostatic force feedback, closed-loop, micromachined accelerometer or closed-loop Coriolis rate gyroscope device, or closed-loop capacitive pressure or force measuring device. When vibration is applied to the device, the error in the time-average output, which is vibration rectification error, due to this input vibration is minimized or eliminated. The geometry resulting from practice of the present invention is space-efficient because drive force is maximized while vibration rectification is minimized or eliminated.

13 Claims, 6 Drawing Sheets

LOW VIBRATION RECTIFICATION IN A CLOSED-LOOP, IN-PLANE MEMS DEVICE

FIELD OF THE INVENTION

The present invention relates to micromachined sensor devices and methods, and in particular to electrostatic comb-drive, closed-loop, in-plane, micromachined, capacitive accelerometers, Coriolis rate gyroscopes, and pressure and force measuring devices.

BACKGROUND OF THE INVENTION

Microelectromechanical system (MEMS) capacitive electrostatic comb-drive, closed-loop, in-plane, micromachined, capacitive pick-off accelerometer devices, closed-loop Coriolis rate gyroscope devices, and closed-loop capacitive pressure and force measuring devices are generally well-known. In particular, silicon-based, micromachined accelerometers are displacing accelerometers of more mature architectures in current applications, and are creating new markets where the advantages of small size and low cost are enabling qualities. One critical area of performance that poses a major challenge for MEMS capacitive accelerometers is vibration rectification. Vibration rectification is the change in the time-average accelerometer output due to input vibration. Vibration rectification manifests as an apparent change in the DC acceleration when none is being experienced.

Current MEMS capacitive accelerometers, Coriolis rate gyroscope devices, and closed-loop capacitive force measuring devices have very poor vibration rectification performance. For example, an input vibration of 10 Grms along the input axis of a known electrostatic comb-drive MEMS capacitive pick-off accelerometer is able to change the average output by as much as 0.1 g's. This large vibration rectification makes these accelerometers unsuitable for current tactical and navigation-grade applications.

In a closed-loop capacitive pick-off accelerometer, rectification error is driven by several sources. For example, rebalance force is not linear relative to the voltage applied to the electrostatic comb-drive. The rebalancing force is proportional to the square of the applied voltage difference between sets of interacting moveable and fixed comb teeth. There are several well-known ways to accomplish linearization of the applied voltage. For example, a square root function can be placed in the feedback loop. The various methods of linearizing this relationship, however, are not relevant to the present invention.

Scale factor may have asymmetry in a closed-loop capacitive pick-off accelerometer. That is, the scale factor in the positive input direction may not equal the scale factor in the negative direction. The scale factors in the two directions must match to avoid rectification. This is also well-known, can be corrected for, but is not relevant to the present invention.

A third source of rectification in a closed-loop capacitive pick-off accelerometer is a dependence of rebalance force on proof mass position. In current art, closed-loop MEMS capacitive pick-off accelerometers with electrostatic feedback use one of two configuration options.

Figure 1:
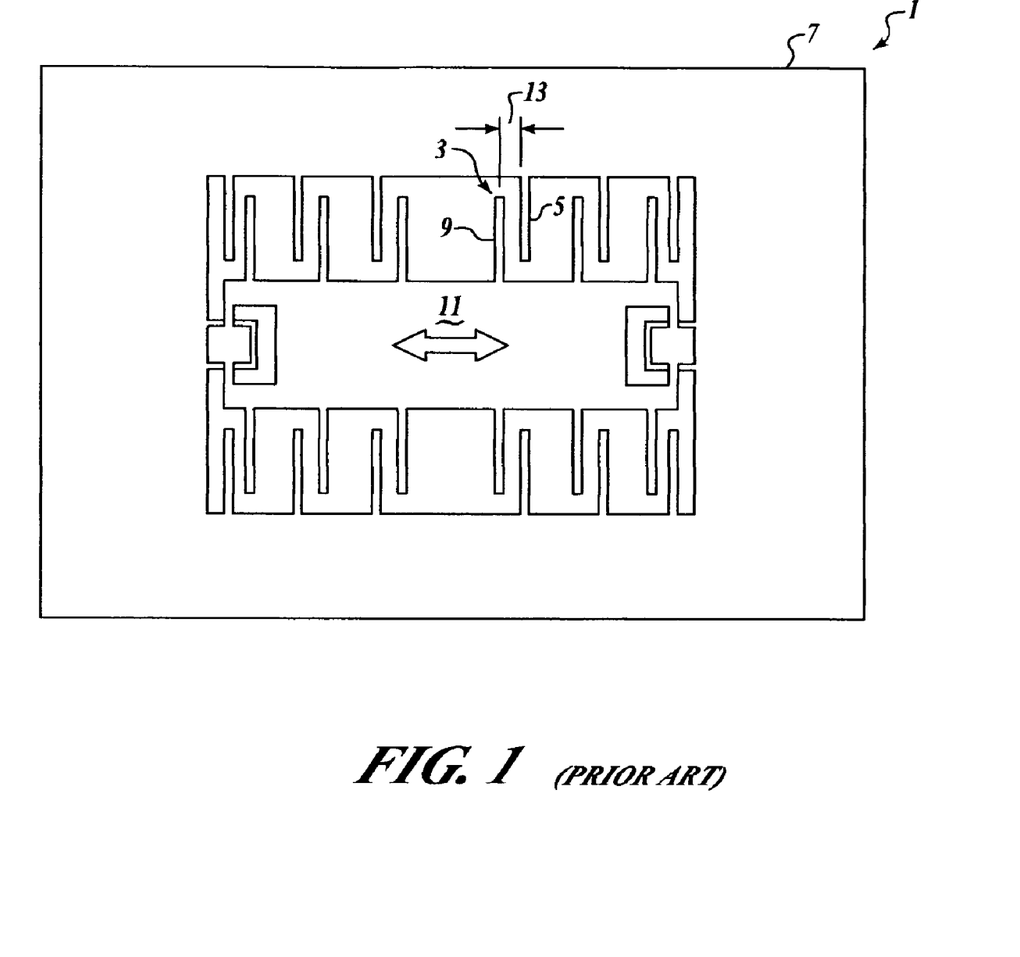
FIG. 1 is a parallel-plate drive accelerometer configuration widely utilized in the prior art.

FIG. 1 illustrates a parallel-plate drive configuration which is widely utilized in the prior art. A closed-loop capacitive pick-off accelerometer 1 of the prior art utilizes a series of parallel plate pairs 3. In each pair 3, one tooth 5 is fixed relative to a supporting frame 7, and the other tooth 9 is movable and part of a movably suspended proof mass 11. With in-plane proof mass motion, a gap 13 between the two plates 5, 9 varies, as indicated by the arrow. For a given voltage differential across the two plates 5, 9, the force is proportional to $1/gap^2$, and so is highly nonlinear with the proof mass motion that results from vibration. Because of this relationship, for a constant applied voltage, vibration raises the time-average force and a rectification error results. This parallel plate drive configuration provides a large nominal force, but very poor rectification performance.

Figure 2:
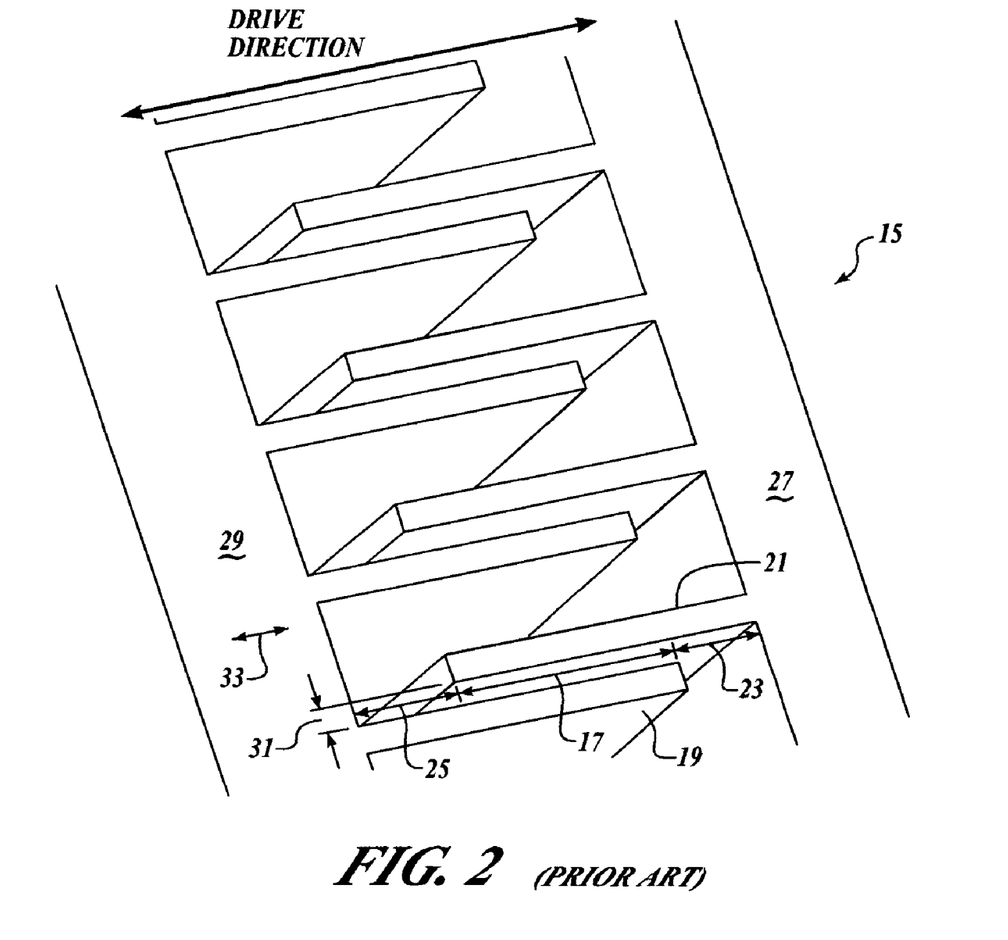
FIG. 2 is a lateral comb drive device configuration known in the prior art.

FIG. 2 illustrates a lateral comb drive configuration which is also known in the prior art. The lateral comb drive concept is taken from non-accelerometer applications where a constant force is desired that is independent of the comb engagement or overlap. In a lateral comb drive device 15, a "constant" force drive is achieved by making both the overlap 17 of the fixed and movable comb teeth 19, 21 and the end-gap 23, 25 between the movable teeth 19 and the fixed frame 27 and between the fixed teeth 21 and the movable proof mass 29, large relative to both the tooth side spacing 31 and the allowed relative lateral motion 33. In applications where space is not at a premium, and only a low-g operating range is required, the lateral comb drive maybe an acceptable solution to the vibration rectification problem in MEMS closed-loop accelerometers. However, lateral drives of this type consume a large amount of space, add mass, and do not provide a large nominal force. Therefore, if low rectification is desired, force must be sacrificed. These lateral comb drives also result in a relatively large nominal capacitance between the sets of fixed and movable comb teeth 19, 21, which is potentially undesirable from an electronics viewpoint. For these reasons, this method is rarely used.

A fourth source of rectification is a force that a damping fluid exerts on the proof mass during vibration. Typically, MEMS accelerometers rely on gas damping to achieve acceptable dynamic performance. Gas-spring damping effects, however, often produce a non-zero time average force on the proof mass as it travels through a cycle of vibration. Many variables affect this rectification error which is a function of the detailed geometry of the damping gaps, the gas type, pressure and temperature, and the magnitude and frequency of the input vibration. The result is a highly complex fluid dynamics problem. Furthermore, the magnitude of this rectification error is potentially extremely large.

Therefore, devices and methods for overcoming these and other limitations of typical state of the art MEMS accelerometers are desirable.

SUMMARY OF THE INVENTION

The prior art fails to provide a method for determining a lateral comb drive geometry which minimizes or completely eliminates rectification and, at the same time, provides a sufficiently large force for a given drive area and applied voltage. What is needed in the art is a method for significantly reducing or eliminating this source of rectification within a compact drive geometry.

The method of the present invention provides a geometry of a lateral comb drive for an in-plane, electrostatic force feedback, micromachined accelerometer, closed-loop Coriolis rate gyroscope devices, and closed-loop capacitive pressure and force measuring devices.

When vibration is applied along an accelerometer's input axis, the error in the time-average output, which is the vibration rectification error, due to this input vibration is minimized or eliminated. The geometry resulting from practice of the present invention is space-efficient because drive force is maximized while vibration rectification is minimized or eliminated.

The present invention is an apparatus and method for reducing rectification error in a microelectromechanical system (MEMS) electrostatic comb-drive, closed-loop, in-plane, accelerometer device. This invention provides both an analytical and empirical method of locating a comb tooth overlap that results in minimum or zero rectification error for any chosen general tooth geometry.

The method includes: selecting an initial comb tooth geometry, including selecting initial tooth width and length dimensions, and the spacing between each moveable tooth and the adjacent fixed tooth. These selections are made as a function of overall design requirements and silicon fabrication design rules. A finite element model is constructed of at least one tooth pitch of the initially selected comb tooth geometry. An initial tooth overlap dimension is selected as a starting point. Using a computer aided design (CAD) program, a finite element model is constructed of at least one tooth pitch of the proposed tooth geometry. A finite element analysis calculation of capacitance is performed for both the selected initial tooth overlap dimension and for each of a plurality of different tooth overlap dimensions both greater than and less than the initial tooth overlap dimension. A polynomial fit of at least 4th order is performed for capacitance versus tooth overlap. The 3rd derivative of this polynomial is formed. The tooth overlap dimension that forces this 3rd derivative to zero is then determined. This amount of tooth overlap results in zero vibration rectification.

According to another aspect of the invention, the desired amount of overlap is obtained through an empirical rather than analytical method. A number of test accelerometer devices are fabricated with varying tooth overlap dimensions, and vibration rectification measurements are made. When the range of fabricated geometries span the desired inflection point, interpolation of the test results yields the precise position of zero-rectification.

According to one aspect of the invention, an accelerometer device constructed in accordance with the earlier steps of the method is calibrated to remove rectification errors due to manufacturing variations. These variations include unintended variations that move the ideal inflection point where rectification error is minimum or zero, and geometry variations that introduce a rectification error due to non-symmetries in gas-damping. Two calibration methods are presented. Each method repositions the moveable teeth slightly relative to the fixed teeth, whereby the closed-loop null position is at the actual zero rectification position. Calibrating the accelerometer device is achieved by either bleeding a non-zero bias voltage into the capacitive pick-off circuit of the accelerometer, or by changing one of the two pickoff excitation voltages relative to the other, while vibrating the accelerometer along an input axis thereof. Calibration is complete when the position is found where the resulting measured rectification error is zero. If the nominal comb drive geometry is as determined by the analytical or empirical methods of this invention, then the amount of displacement needed to reposition the moveable teeth to the desired position within an individual accelerometer is very small.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF PREFERRED EMBODIMENT

In the Figures, like numerals indicate like elements.

The Figures illustrate the method of the present invention for determining a lateral comb drive geometry which minimizes or completely eliminates rectification and, at the same time, provides a sufficiently large force for a given drive area and applied voltage.

Figure 3:
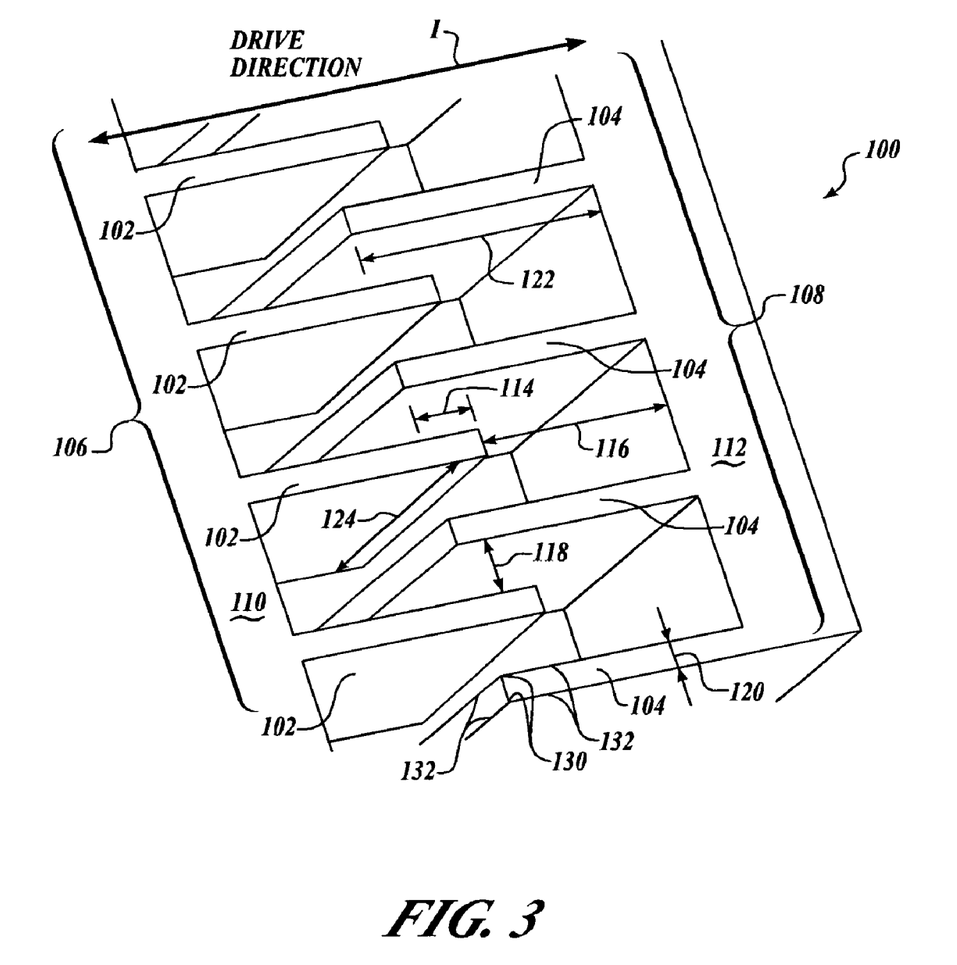
FIG. 3 is a perspective view of a portion of an electrostatic comb-drive, closed-loop, in-plane, micromachined, capacitive pick-off accelerometer structured according to the method of the present invention.
Figure 6:
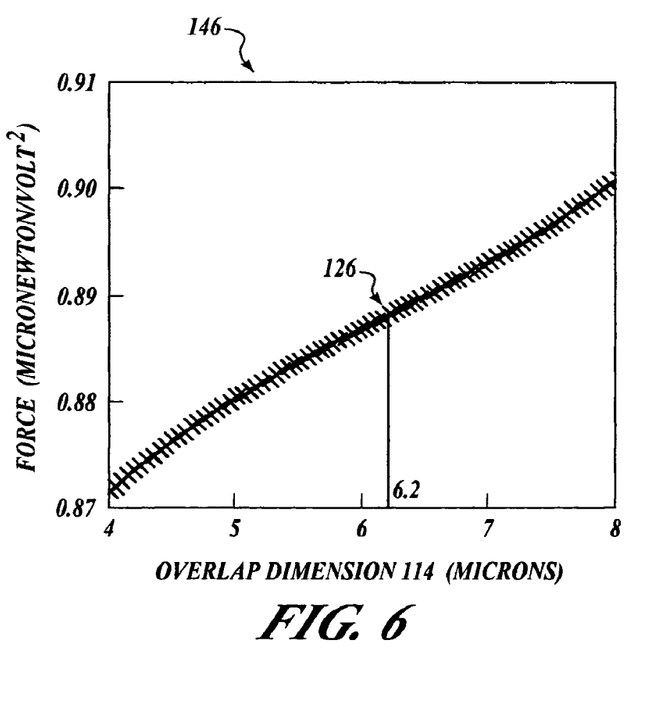
FIG. 6 is a graph that illustrates force versus overlap position as obtained from FIG. 5, which is proportional to the derivative of capacitance versus capacitor plate overlap.

FIG. 3 is a perspective view of a portion of an electrostatic comb-drive, closed-loop, in-plane, micromachined, capacitive pick-off accelerometer or other closed-loop Coriolis rate gyroscope device, or closed-loop capacitive pressure or force measuring device 100 that is structured according to the method of the present invention. The accelerometer or other device 100 is one example of cooperative movable and fixed comb drive teeth 102, 104 arranged in a closed-loop, in-plane MEMS accelerometer in such manner that the drive does not rectify due to the rebalance force versus position relationship. The accelerometer or other device 100 utilizes a lateral comb drive selected as a function of geometry found according to the method of this invention. The geometry of the movable and fixed comb drive teeth 102, 104 which achieves the desired result of substantially eliminating rectification due to the rebalance force versus position relationship is derived via finite element analysis of the capacitance between the cooperative movable and fixed combs 106, 108 on a movable proof mass 110 and a fixed frame 112, respectively. The characteristics of capacitance change with respect to relative motion between the movable and fixed combs 106, 108 determines the rebalance force versus position relationship, hereinafter force-position relationship. The force-position relationship determines the resulting rectification. For any small amplitude of periodic motion, an overlap 114 distance that eliminates rectification for that motion is determinable by the method of the invention. A constant force-position relationship, as described in FIG. 2 above, is not necessary. Nor is a linear force-position relationship necessary. Rectification is substantially eliminated by driving the 3rd derivative of the capacitance, which is proportional to the 2nd derivative of the force-displacement relation, to substantially zero. A very large tooth overlap 114 and end gap 116 satisfy this relationship and result in low rectification, but require a large amount of real estate. This real estate requirement reduces the number of lateral gaps 118 between adjacent teeth 102, 104 that can be placed in a given area, and so lowers the rebalance force available with a given voltage difference. The method of the present invention optimizes the tooth geometry and permits use of relatively short comb teeth 102, 104 and a reasonably small overlap 114, such that a low rectification error is achieved while maintaining a useful rebalance force, i.e., g-range. The tooth geometry illustrated in FIG. 3 is one example of a tooth geometry that produces very low rectification.

The example shown in FIG. 3 has teeth 102, 104 that have a width 120 of 3 microns by a length 122 of 20 microns. The lateral gaps 118 between adjacent movable and fixed comb drive teeth 102, 104 is 5 microns, and the tooth overlap 114 between adjacent movable and fixed comb drive teeth 102, 104 is 6.2 microns. The teeth 102, 104 have a depth 124 that is large as compared to the foregoing dimensions so that fringe-field effects at the top and bottom of the teeth can be neglected for most applications, whereby the problem is treated as two-dimensional (2-D). For the geometry described here, the average of the 2nd order derivative of the force-position relationship is very low over a reasonable range of displacement amplitudes about the 6.2 micron tooth overlap 114. As engagement of the teeth 102, 104 changes, the character of "fringe" fields of the electrostatic pattern changes. The method of this invention determines the amount of overlap 114, 6.2 microns in the example, where the net force contribution of the fringe fields is linear. This occurs at an inflection point 126 on a plot of force versus position (shown in FIG. 6).

Figure 4A:
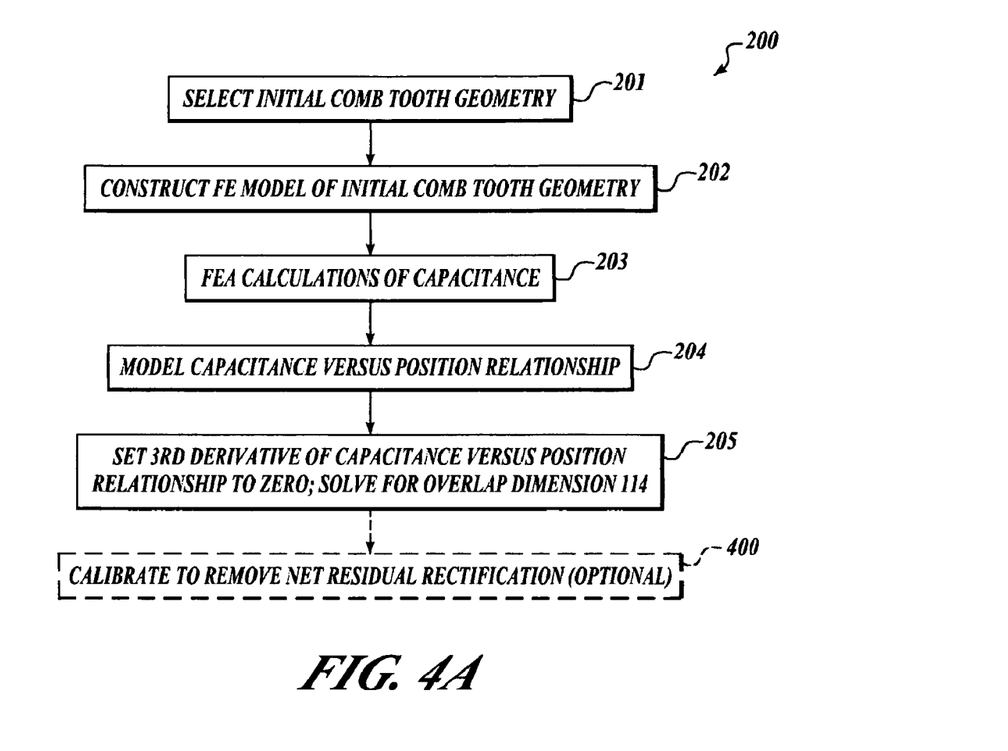
FIG. 4A is a flow diagram that illustrates the analytical method of the invention for an accelerometer.

FIG. 4A is a flow diagram 200 that illustrates the method of the invention for a 2-D analysis as applied any given drive design, such as but not limited to the example in FIG. 3.

In Block 201, initial lateral comb tooth geometry: tooth thickness 120 and length 122, the lateral or side-gap 118, and the tooth overlap 114 dimensions, is selected as a function of overall design requirements and conventional fabrication design rules as are generally well-known in the art. Alternatively, the method of the invention is useful for minimizing or eliminating rectification in an existing design. Thus, if actual representative parts are available, then measurements on theses parts provide the tooth geometry. Whether the comb tooth geometry is being currently designed, or is a pre-existing design, the analysis is the same.

In Block 202, a finite element (FE) model is constructed of the initially selected or previously existing lateral comb tooth geometry. For many applications only a small portion of the model, for example one tooth pitch, need be analyzed because symmetry can be applied to determine overall characteristics of the cooperative movable and fixed combs 106, 108. The example in FIG. 3 assumes rectangular teeth 102, 104 with sharp corners 130 and edges 132. In any particular application of the invention, however, the teeth 102, 104 may have taper, the corner shape may be altered due to the etching process, or the geometry may deviate in other ways from the example shown in FIG. 3. Regardless the variation of geometry from that shown in FIG. 3, a finite element model of the geometry is constructed using a computer aided design (CAD) program, by example and without limitation using either a proprietary or a commercially available CAD program such as "Ansoft."

In Block 203, a finite element analysis (FEA) calculation of capacitance is performed using the CAD program for both the selected initial overlap dimension 114 and for each of many different overlap dimension 114 both greater than and less than the initial overlap dimension 114. As the moveable comb teeth 102 further engages the fixed comb teeth 104, the capacitance between the movable and fixed comb teeth 102, 104 increases monotonically. Therefore, the overlap dimension 114 is modified slightly in the FE model, and the capacitance calculation is performed for this modified overlap dimension 114. This modification of the overlap dimension 114 and performance of the capacitance calculation is repeated for a number of different overlap dimensions around the initial overlap dimension 114. The number of different overlap dimensions 114 utilized, the spacings between adjacent overlap dimensions 114, and the range of different overlap dimensions 114 are determined as a function of the desired accuracy of the result.

Figure 5:
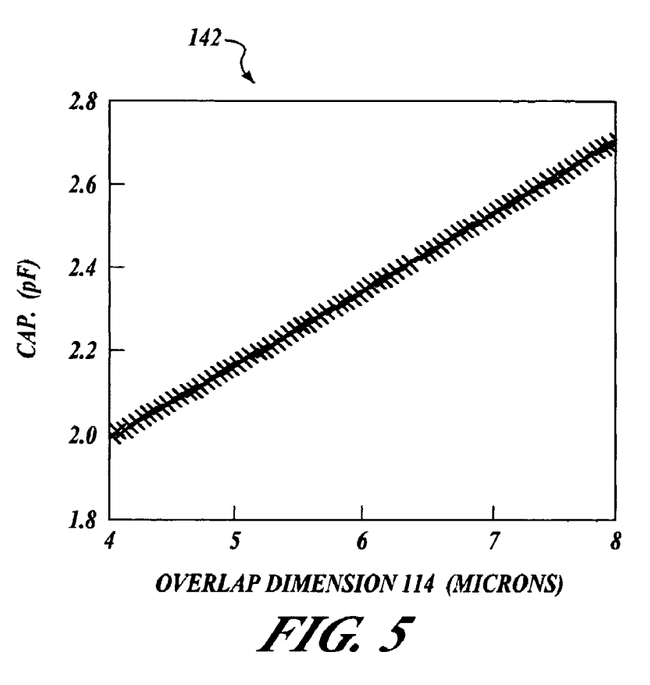
FIG. 5 is a graph that illustrates data gathered according to the analytical method of the invention showing the results of a series of FEA capacitance calculations.

FIG. 5 is a graph 142 that illustrates the result of the series of FEA capacitance calculations for the example shown in FIG. 3.

Thus, the graph 142 is a plot of capacitance versus the amount of tooth overlap 114 for a small range of engagement. As is well-known in the art, the force between two capacitor surfaces is given by:

Force=0.5 $dC/dx*V^2$, where dC/dx is the derivative of capacitance with respect to the overlap distance 114, and V is the electrical potential difference between the two combs 106, 108.

FIG. 6 is a graph 146 that illustrates the force versus overlap dimension 114 for the same small overlap range shown in FIG. 5, where the force is calculated using the equation above. It is well known in the art of electrostatic accelerometers that the force between the two capacitor plates embodied by the movable and fixed comb drive teeth 102, 104 is directly proportional to the partial derivative of the capacitance with respect to relative motion between the two capacitor plates so that the graph 146 illustrates the force-position relationship, where force is given in a force unit per volt$^2$, and the overlap dimension 114 is again given in microns. An inflection point 126 is observed at the overlap dimension 114 that results in zero rectification.

As is observed in the graph 146, the inflection point 126 occurs along the curve of the graphed data, the inflection point 126 occurring at about the point commensurate with the 6.2 micron overlap dimension 114 in this example, where the 2nd derivative of the force relative to position is zero as it transverses between negative and positive values. As discussed above, the 3rd derivative of capacitance relative to position is proportional to the 2nd derivative of the force-displacement relation and so is also zero at the inflection point 126. The smooth behavior and two-fold symmetry of the force-position relationship shown in the graph 146 results in the average force being close to zero over any small region centered about this inflection point 126. That is, the average of a force oscillating about this inflection point 126 is substantially the same as the static value at the inflection point 126. Therefore, the vibration rectification is near zero for overlap dimensions 114 in the vicinity of the inflection point 126.

In Block 204, the capacitance versus position relationship is modeled mathematically using an appropriate mathematical method of curve fitting, such as a polynomial fit. Accordingly, well-known numerical methods are employed for analyzing the capacitance-versus-position relationship and determining a mathematical model of this relationship. When a polynomial fit of the capacitance-versus-position relationship is performed, the polynomial fit is of at least 4th order or at least high enough that residuals from the fit are acceptably small for a given desired accuracy of the result. The 1$^{st}$ derivative of the polynomial is proportional to the force as a function of position.

In Block 205, the 3rd derivative of the capacitance versus position relationship is set to zero and solved for the overlap dimension 114 that forces it to zero. This overlap dimension 114 produces zero rectification. This determination of the zero-rectification overlap dimension 114 completes the definition of the tooth geometry.

Analysis of the exemplary tooth geometry illustrated in FIG. 3, as presented here, utilized a 2-D model. When the teeth 102, 104 for the accelerometer or other device 100 have a depth 124 that is large as compared to other tooth dimensions, a 2-D analysis provides results that are acceptable for many applications. When the depth 124 of the teeth 102, 104 is not large compared to the gap dimension 118, a 3-D analysis is performed.

Figure 4B:
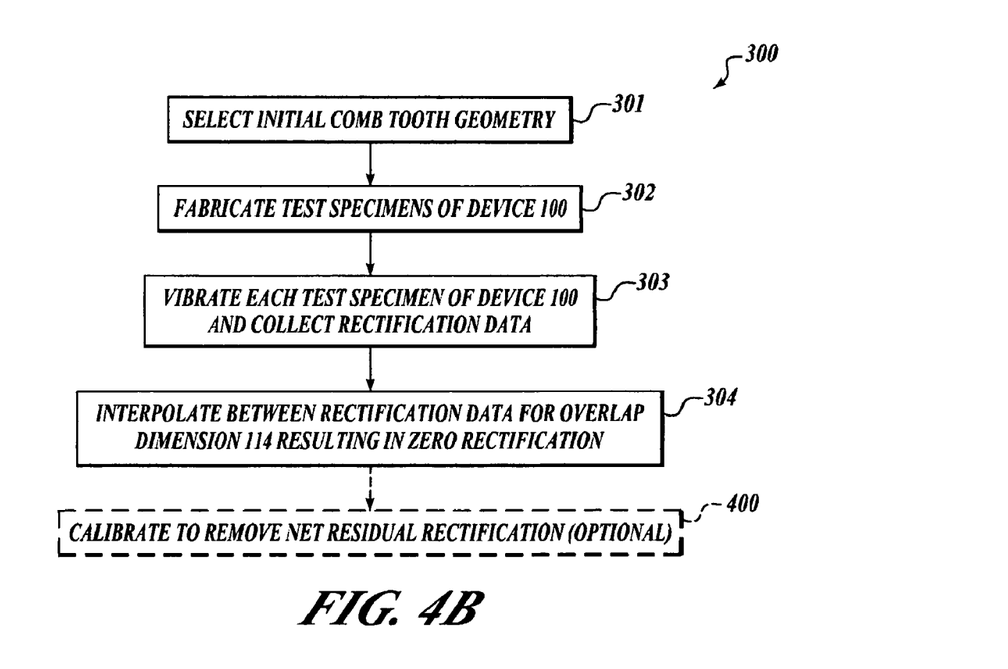
FIG. 4B is a flow diagram that illustrates the empirical method of the invention for an accelerometer.

FIG. 4B is a flow diagram 300 that illustrates an empirical alternative of the method of the invention wherein empirical data of measured rectification errors are relied upon, rather than finite element analysis of a model. For example, a series of different comb drives with different variations in tooth overlap 114 are built and tested. Curve fitting and interpolation of the resulting measured rectification errors leads to a geometry selection with low rectification.

According to this alternative embodiment of the method of the present invention, the tooth length 122 and lateral gap 118 dimensions are optionally allowed to vary. The cooperative fixed and moveable teeth 102, 104 optionally differ from one another in shape. Many geometry variations are optionally allowed, and a "Design of Experiment" is utilized to arrive at a general optimized geometry, of which one goal is low rectification.

In Block 301, initial lateral comb tooth geometry: tooth thickness 120 and length 122, the lateral or side-gap 118, and the tooth overlap 114 dimensions, is selected as a function of overall design requirements and conventional fabrication design rules as are generally well-known in the art.

In Block 302, a series of test specimens of the accelerometer or other device 100 of the invention are fabricated with variations in the tooth overlap 114 within a range of tooth overlap dimensions expected to be experienced in actual operation. The quantity of test specimens fabricated is a function of the desired accuracy of the result.

In Block 303, each test specimen of the accelerometer or other device 100 is placed on a vibration generator or "shaker head," and the test specimen of the accelerometer or other device 100 is vibrated along it's input axis I (shown in FIG. 3) using the frequency and magnitude of vibration that is expected to be encountered in operation. Rectification data is collected using appropriate test equipment.

In Block 304, the rectification data collected in Block 302 is analyzed. When the selected range of tooth overlap dimensions 114 includes the tooth overlap dimension 114 that produces an acceptably low or zero rectification error, the sign of the measured rectification error changes smoothly between negative and positive. This rectification data is interpolated to determine the overlap dimension 114 that produces low or zero rectification error. This determination of the zero-rectification overlap dimension 114 completes the definition of the tooth geometry.

Even with a comb-drive geometry selected per the method of the present invention, natural variation of the manufactured geometry causes a small, non-zero 2nd order electrostatic force-position derivative and, therefore, a rectification error. Manufacturing tolerances also result in slight non-symmetry in damping gap geometry, as discussed below. Therefore, even in the best example of a good design, two sources of small amounts of rectification are present. A net residual rectification is the sum of these two sources of rectification. According to the present invention, the net residual rectification is removed by commanding the proof mass 110 to a null position relative to the frame 112 where the small gas rectification error exactly cancels the error due to a small non-zero 2nd derivative of the electrostatic force-position relationship.

Rectification due to gas-spring effects alone are potentially very large in MEMS accelerometers and other MEMS devices and therefore must be managed to achieve good performance. Therefore, according to one or more different embodiments of the present invention, this gas-spring effects source of rectification is optionally eliminated simultaneously with the rectification source resulting from the manufactured geometry by commanding the proof mass 110 to move to a zero bias-rectification position. Regardless the details of the comb tooth geometry, a gas-damped MEMS device contains small gaps between the moving proof mass 110 and adjacent static parts, i.e., the frame 112. In general, as the proof mass 110 moves in response to external input, some gaps are squeezed smaller while others are increased. The periodic motion of vibration leads to a periodic fluctuation in fluid forces on the proof mass 110. If there is perfect gap symmetry when the proof mass is at its mean position, then the net force on the proof mass 110, averaged over one cycle, is zero. However, due to imperfections in the fabrication of device features, an asymmetry of the gap arrangement will always result. The physics of fluid flow then causes a net time-average force to be applied to the proof mass 110 by the gas. This force cannot be distinguished from an inertial force, and thus represents an error. The present invention provides a method for removing this fluid-driven error due to unintended non-symmetry. Accordingly, in FIGS. 4A and 4B, the error is optionally removed via a calibration procedure 400 of the invention. At least two different calibration methods 500 and 600 are contemplated by the invention for performing the calibration procedure 400.

Figure 7:
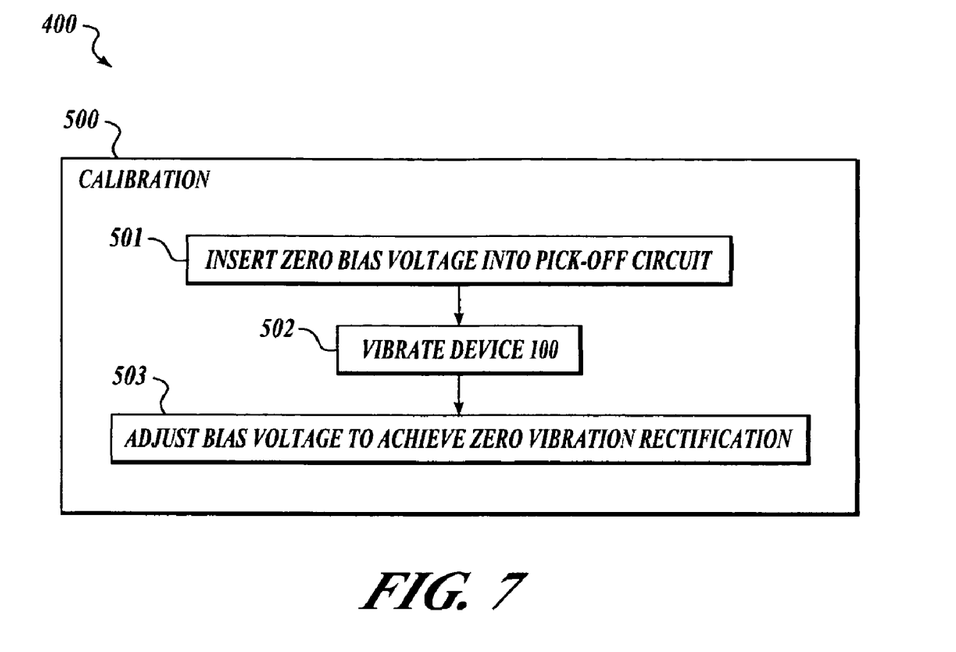
FIG. 7 is a flow diagram of one embodiment of a calibration procedure according to the invention.

FIG. 7 is a flow diagram of one embodiment of the calibration method 500 for performing the calibration procedure 400 of the invention (shown in FIGS. 4A and 4B). In Block 501, a bias voltage is bled into the capacitive pick-off circuit of the device 100 such that the servo drives the proof mass 110 to a non-zero pick-off differential capacitance. Adjusting this bias voltage in turn adjusts the position of the proof mass 110 relative to the frame 112. In Block 502, the accelerometer or other device 100 is placed on a vibration generator or "shaker head," and the accelerometer or other device 100 is vibrated along it's input axis I (shown in FIG. 3). In Block 503 this bias voltage is adjusted until a balance in the fluid forces is found. The position where the fluid forces are balanced is a mean position of the proof mass 110 relative to the frame 112 where the rectification error is zero.

Figure 8:
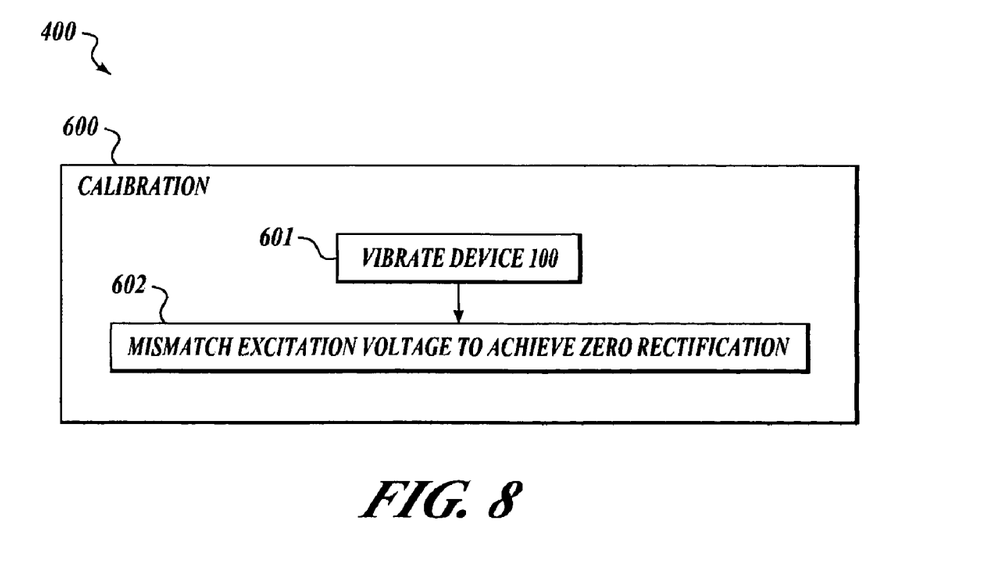
FIG. 8 is a flow diagram of an alternative embodiment of the calibration procedure according to the invention.

FIG. 8 is a flow diagram of one alternative calibration method 600 for performing the calibration procedure 400 of the invention (shown in FIGS. 4A and 4B). Typically, the two capacitive pick-off sections in a closed-loop device 100 are each driven by an AC excitation voltage. According to the alternative embodiment of FIG. 8, the proof mass 110 is forced to the zero-rectification position by changing the amplitude of one of the two AC excitation voltages. This has the effect of changing an apparent differential capacitance between the two capacitive pick-off sections on either side of the proof mass 110 so that the rebalance circuit, or "servo," of the device 100 moves the proof mass 110 to a new position relative to the frame 112 that re-zeros the differential capacitance. In Block 601, the accelerometer or other device 100 is placed on a shaker head and vibrated along it's input axis I (shown in FIG. 3). In Block 602, the excitation amplitude mismatch is adjusted to zero the rectification error during vibration of the accelerometer or other device 100.

As discussed above, it is well known in the art of electrostatic accelerometers that the force between the two capacitor plates embodied by the movable and fixed comb drive teeth 102, 104 is directly proportional to the partial derivative of the capacitance with respect to relative motion between the two capacitor plates. The inflection point 126 in FIG. 6 is observed at the overlap dimension 114 that results in zero rectification. The inflection point 126 thus occurs at about the overlap dimension 114 where the 2nd derivative of the force relative to position is zero as it transverses between negative and positive values. As is also discussed above, the 3rd derivative of capacitance relative to position is proportional to the 2nd derivative of the force-displacement relation and so is also zero at the inflection point 126. The smooth behavior and two-fold symmetry of the force-position relationship shown in the graph 146 indicates that the average of a force oscillating about this inflection point 126 is substantially the same as the static value at the inflection point 126, and the vibration rectification is near zero for overlap dimensions 114 in the vicinity of the inflection point 126. Thus, while two methods are described for determining overlap dimensions 114 that result in near zero vibration rectification for a particular tooth geometry, according to other embodiments of the present invention, other methods for determining a relatively compact tooth geometry having the null position located such that the 2nd derivative of force relative to engagement position is substantially zero is equivalent to the methods described herein.

Furthermore, when the net residual rectification error is small enough at the initial null setting of the servo, cancellation alone works well over a narrow range in put amplitudes and frequency.

While the preferred embodiment of the invention has been illustrated and described, it will be appreciated that various changes can be made therein without departing from the spirit and scope of the invention.

What is claimed is:

1. A method for making a microelectromechanical system (MEMS) electrostatic comb-drive device, the method comprising:
    constructing a finite element model of an initial comb tooth geometric unit;
    selecting an initial comb tooth overlap dimension;
    performing a finite element analysis calculation of capacitance for both the selected initial overlap dimension and for each of one or more different overlap dimensions adjacent to the initial overlap dimension;
    constructing a model of a relationship of capacitance versus overlap dimension;
    applying a second derivative test to solve for an inflection point in the relationship of capacitance versus overlap dimension;
    selecting an overlap dimension corresponding to the inflection point; and
    making a MEMS electrostatic comb-drive by orienting a movable proof mass having comb teeth to a stationary comb tooth frame, so that the comb teeth and the stationary comb tooth frame overlap by the selected overlap dimension.

2. The method of claim 1 wherein the initial comb tooth geometric unit comprises a single tooth pitch.

3. The method of claim 1 wherein performing a finite element analysis calculation of capacitance for both the selected initial overlap dimension and for each of one or more different overlap dimensions adjacent to the initial overlap dimension further comprises performing a finite element analysis calculation of capacitance for each of a plurality of different overlap dimensions both greater than and less than the initial overlap dimension.

4. The method of claim 1 wherein constructing a model of the capacitance versus overlap dimension relationship further comprises constructing a mathematical model.

5. The method of claim 4 wherein constructing a mathematical model of the capacitance versus overlap dimension relationship further comprises a conventional numerical method.

6. The method of claim 4 wherein constructing a mathematical model of the capacitance versus overlap dimension relationship further comprises mathematically fitting a curve to the relationship.

7. The method of claim 6 wherein fitting a curve to the capacitance versus overlap dimension relationship further comprises using a polynomial fit to model the capacitance versus overlap dimension relationship.

8. The method of claim 7 wherein using a polynomial fit to model the capacitance versus overlap dimension relationship further comprises using at least a fourth order polynomial fit.

9. The method of claim 1 further comprising calibrating to remove residual rectification, calibrating comprising:
    initially adjusting a position of the proof mass relative to the frame to a position of non-zero differential capacitance;
    vibrating the adjusted proof mass relative to the frame along an input axis;
    additionally adjusting the position of the vibrating proof mass relative to the frame to a position where fluid forces operating on the proof mass are balanced relative to the comb tooth geometry, thereby calibrating the MEMS device.

10. The method of claim 9 wherein both initially and additionally adjusting the position of the proof mass relative to the frame further comprises applying a bias voltage across first and second opposing plates of a capacitive pick-off circuit, the first and second opposing plates being separated by a gap, the first plate being rigidly connected and in electrical communication with the proof mass, and the second plate being rigidly connected and in electrical communication with the frame of the device.

11. The method of claim 9 wherein calibrating further comprises:
    vibrating the device along an input axis; and
    balancing fluid forces operating on the vibrating proof mass with the actual comb tooth geometry.

12. The method of claim 11 wherein balancing further comprises adjusting a position of the proof mass relative to the frame to a different relative position where fluid forces operating on the proof mass are balanced with the actual comb tooth geometry.

13. The method of claim 12, further comprising initially adjusting a position of the proof mass relative to the frame to a position exhibiting substantially zero rectification; and
    wherein adjusting a position of the proof mass relative to the frame to a different relative position where fluid forces operating on the proof mass are balanced with the actual comb tooth geometry further comprises, after initially adjusting the relative position of the proof mass to the zero rectification position and during vibrating the device, additionally adjusting the position of the proof mass relative to the frame.

* * * * *